United States Patent [19]

Bocson et al.

[11] Patent Number: 4,846,506
[45] Date of Patent: Jul. 11, 1989

[54] QUICK CONNECT COUPLING

[75] Inventors: David A. Bocson, Mt. Clemens; Phillip J. Norkey, Jackson, both of Mich.

[73] Assignee: U.S. Plastics Corporation, Mt. Clemens, Mich.

[21] Appl. No.: 93,267

[22] Filed: Sep. 4, 1987

[51] Int. Cl.⁴ .............................................. F16L 37/12
[52] U.S. Cl. ........................................ 285/4; 285/27; 285/319; 285/901; 285/921
[58] Field of Search ............... 285/4, 3, 901, 319, 285/921, 27

[56] References Cited

U.S. PATENT DOCUMENTS

| | | | |
|---|---|---|---|
| 1,933,117 | 10/1933 | Markle | 285/3 |
| 3,900,223 | 8/1975 | Schafer et al. | 285/4 |
| 4,240,654 | 12/1980 | Gladieux | 285/276 |
| 4,511,359 | 4/1985 | Vaillancourt | 285/3 X |
| 4,541,658 | 9/1985 | Bartholomew | 285/319 |
| 4,601,497 | 7/1986 | Bartholomew | 285/319 |
| 4,610,469 | 9/1986 | Wolff-Mooij | 285/901 X |
| 4,637,640 | 1/1987 | Fournier et al. | 285/319 |
| 4,681,351 | 7/1987 | Bartholomew | 285/319 |
| 4,778,203 | 10/1988 | Bartholomew | 285/319 X |

FOREIGN PATENT DOCUMENTS

| | | |
|---|---|---|
| 2307154 | 8/1974 | Fed. Rep. of Germany . |
| 2853281 | 6/1979 | Fed. Rep. of Germany . |
| 3631812 | 3/1987 | Fed. Rep. of Germany .......... 285/4 |
| 2493467 | 5/1982 | France . |

Primary Examiner—Thomas F. Callaghan
Attorney, Agent, or Firm—Lalos & Keegan

[57] ABSTRACT

A quick connect coupling assembly comprising a housing having an internal passage divided into a large entry end and a reduced diameter, coaxially aligned smaller passage for receiving a tubing adapted to fit into said passages and to snap into fluid-tight sealing relationship with said smaller passage. The assembly includes an improved retainer for preventing disconnection of the tubing and, optionally, a perforatable dust shield for sealing the entry passage of the housing during shipment and handling prior to insertion of a tubing conduit, and after perforation by the tubing upon assembly, then seals the tubing in the housing entry passage. A subassembly comprising the housing, retainer and dust shield is also disclosed.

20 Claims, 2 Drawing Sheets

QUICK CONNECT COUPLING

The present invention relates to improvements in a coupling for making quick connections between separate fluid conduits.

BACKGROUND OF THE INVENTION

It has been conventional to interconnect a tubular conduit within the passage of a second conduit, often referred to as a housing, by inserting a leading end of the tubular conduit axially through an entry opening into the housing passage. The latter may comprise an axially extending series of stepped bores or interconnecting passages of different diameters including an enlarged diameter passage connecting the entry opening with a reduced diameter passage. The tubular conduit in such an assembly is provided with an annular external radial projection or enlargement that partitions the conduit into leading and trailing portions and is dimensioned to pass through the entry into the enlarged diameter passage, but to prevent insertion into the reduced diameter passage.

Suitable sealing means may be provided within the reduced diameter passage to effect an annular seal between the housing and leading portion of the conduit. A bushing within the reduced diameter passage extends around the leading portion of the conduit between the radial enlargement and the sealing means to hold the latter in position. A retainer within the enlarged diameter passage has resilient portions that yield to enable insertion of the conduit and its enlargement into the housing passage, but at the assembled position engage portions of the housing and conduit enlargement to prevent removal of the conduit and to effect an efficient fluid tight coupling.

Many retainers have been designed heretofore, some molded from flexible plastic and others formed from resilient metals, such as sheet spring steel, but all such retainers have been subject to objections. For example, the plastic retainers lack compactness and are unsatisfactory for use in couplings demanding strength or subject to high temperature. In some applications, the pressure tending to force the conduit axially out of the housing passage can amount to several hundred pounds. In consequence, conventional couplings are subject to excessive shearing or buckling when formed from resilient plastics, or even spring steel if not properly constructed.

Couplings of the type described are frequently employed in corrosive environments, as for example when used with an automobile transmission, and are thus treated with a protective corrosion resistant coating. Formed sheet spring steel retainers tend to abrade the surfaces of the tubular conduit and housing portions of the coupling which are in contact with the outer contacting portions of the retainer itself and thus wear through the protective coatings on those portions, especially when the coupling is used with vibrating machinery or pulsating pressures. Certain formed sheet spring steel retainers subjected to relatively high pulsating pressures have failed during use due to fatigue of the portions of the retainer which repeatedly vibrated in contact against the opposing housing portions.

In order to simplify handling of the parts of the coupling assembly of the type described, it is desirable to provide housing and conduit subassemblies wherein each subassembly is self contained and ready for connection with the other to complete the coupling. Preferably all of the components of each subassembly comprise a unitary assembly suitable for shipping (without loose components requiring separate handling or subject to possible loss) to the location where desired for connection with the other subassembly. Although it has been conventional to provide the conduit, seal, and retainer as a shippable conduit subassembly ready for connection with a housing subassembly, certain conduit subassemblies have not been considered to be satisfactory in that they were open at the entry end and subject to collecting dust, dirt or the like during transit and subject to damage during handling and shipping.

Frequently in use, the aforesaid housing is secured to a hydraulic mechanism, as for example an automotive transmission housing, prior to insertion of the tubular conduit to complete the coupling. It is then desirable to provide a perforatable diaphragm seal to close the housing passage until the aforesaid tubular conduit is inserted, whereby the leading edge of the conduit pierces the diaphragm seal and renders it operative. Perforatable diaphragm seals are well known to the art, but all such seals used heretofore are fixed deep within the housing passage. The entry opening and the enlarged diameter passage of the housing thus remain exposed to dust and incidental corrosive debris which is subsequently carried into the hydraulic mechanism during operation, resulting in damage and excessive abrasive wearing of the mechanism. Heretofore, no one has provided suitable means for closing the entry to the housing passage prior to completion of the coupling by insertion of the conduit.

OBJECTS OF THE INVENTION

Important objects of the invention are to provide an improved coupling of the general type described that overcomes the above noted objections and in particular to provide an improved spring steel retainer that can be formed from a sheet steel stamping for use with such a coupling wherein the retainer is configured to achieve optimum strength and compactness and ability to retain leak-free coupling between conduit and housing under rigorous use conditions including high pressure pulsating or vibrating forces and which also minimizes abrasion of coated surfaces of the housing and conduit.

Other objects are to provide such a coupling utilizing the improved retainer whereby the retainer may be readily released from the conduit by means of a simple tool, thereby to enable removal of the conduit from the housing without removing the retainer or damaging any part of the coupling; to provide an improved shippable housing subassembly including the sealing means and retainer, whereby the subassembly can be readily shipped to the location where it will be used and assembled subsequently with the conduit for completion of the coupling, and whereby prior to assembly with the conduit, the sealing means and retainer are protectively confined within the housing passage against dust or accidental loss.

Other objects are to provide such a coupling including an improved tubular housing and dust shield that are readily attachable for closing the entry opening into the housing passage prior to assembly with the conduit, the dust shield being so constructed as to be especially resistant to accidental removal and which is also shielded by overlying portions of the housing that cooperate with the structure of the seal to resist such removal by external forces; and to provide an improved dust shield for such an assembly that is readily pierced coaxially by insertion of the conduit into the housing passage to allow fluid flow.

Another and more specific object is to provide an improved coupling and retainer of the type described wherein the retainer is economically formed from a one-piece steel sheet stamping of comparatively soft or "half hard" spring strip, such as ASTM 301 or 302 stainless steel sheet, dimensioned for insertion through the entry of the housing passage into the enlarged diameter passage to position a base of the retainer adjacent to said bushing. The base is formed with an opening dimensioned for passage of the leading portion of the conduit coaxially therethrough and to block passage of the radial enlargement of the conduit, whereby the base is confined between said bushing and enlargement when the conduit is assembled within the housing.

A retainer similar to the improved retainers of this invention may comprise a plurality of circumferentially spaced retaining members, each comprising a radially outer locating arm joined at a resilient hinge connection to a radially outer portion of the base and bending axially at said connection to extend axially within said enlarged passage to a trailing end in contact with an annular shoulder of the housing that defines the entry opening into the housing, then bending reversely at a second resilient hinge connection to provide a thrust resisting arm extending axially and radially inwardly at an acute angle with respect to the outer locating arm and into contact with the trailing conduit portion of the conduit at a location adjacent to its radial enlargement, then again bending reversely to provide a reinforcing arm extending along and in contact with the thrust resisting arm to the apex of the acute angle. In this construction, the resilient hinge connections are under tension yieldingly urging the trailing end of the outer locating arm radially outwardly into axially sliding contact with the cylindrical inner surface of the enlarged diameter passage and also yieldingly urging the reverse bend between the thrust resisting and reinforcing arms radially inwardly into said contact with the trailing conduit portion. The reverse bends provide the contact regions for the retaining members where they contact the housing and trailing conduit portion.

In some applications in which such similar retainers have been proposed for use the operating pressure in the coupling tending to force the conduit axially out of coupling engagement with the housing has been high, for example in excess of a thousand pounds per square inch, which pressure is often pulsating several times a minute and must be withstood by the thrust resisting and reinforcing arms of the retainer. The formation of the reverse bend at the angle between the outer locating arm and thrust resisting arm subjects that portion of the retainer to relatively high internal stresses that weaken that bend portion. When the retainer is formed such that the reverse stressed bend is repetitively forced against an annular housing shoulder by operating pressures tending to force the conduit axially from the housing and was formed from heat hardened sheet spring steel, such couplings have failed at the stressed bend when subjected to repeated flexing in consequence of high pulsating pressures.

It is accordingly a principal object of this invention to provide an improved coupling assembly of the above described type which includes a new, improved retainer, which solves the problem of failure of such reverse stressed bend portions of prior retainers that make contact with an annular housing shoulder under high pressure pulsating or vibrating contact types of operation. The improvement comprises forming the retainer with lateral wings that extend circumferentially in opposite directions from the thrust resisting arm, and also extend axially endwise in the direction toward said housing shoulder beyond the aforesaid stressed bend, and terminate in radially outturned pads. When such improved retainer is assembled into a housing the wing-pad portions make contact with that housing shoulder. These lateral wing and pad portions provide structure for positively spacing the outer end of the thrust arm means at its reverse stressed bend portion axially from the housing shoulder during use. In use, these wing-pad portions which are integral with the axial-thrust resisting arms function by providing substitute surfaces which contact the housing shoulder and serve to distribute the pressure induced force, directed along the juxtaposed thrust resisting and reinforcing arms, over circumferentially spaced locations around the periphery of the housing shoulder. The improved coupling assemblies include an improved retainer having a plurality of wing-pad-modified thrust resisting arm means, preferably two, three or more such modified arm means.

Other objects of this invention will appear in the following description and appended claims, reference being had to the accompanying drawings forming a part of this specification wherein like reference characters designate corresponding parts in the several views.

PRIOR ART

Although no prior art is known to applicant that is suggestive of the present invention as claimed, the following patents illustrate the state of the art.

U.S. Pat. No. 2,586,858: F. B. Parsons
3,087,643: J. R. Smirra
3,201,148: L. C. Shurtleff
3,711,125: D. C. Dehar
3,826,523: J. T. Eschbaugh
4,423,892: D. D. Bartholomew
4,541,658: D. D. Bartholomew
4,601,497: D. D. Bartholomew The patents to Parsons, Smirra, and Shurtleff illustrate the use of perforatable diaphragm seals in various types of couplings, but the seals employed are fixed deep within the housing to prevent leakage of fluid from a fluid-filled container prior to completion of the coupling and rupture of the seal by insertion of the conduit. There is no suggestion in the references of the use of a dust shield as disclosed by applicant for preventing the entry of dust or other debris into the housing, either before or after the housing is connected with the aforesaid fluid-filled container, but prior to connection of the housing with the conduit.

Dehar and Eschbaugh illustrate a coupling comprising a tubular housing and a tubular conduit wherein the latter is provided with an annular radial enlargement cooperable with a retainer, but except for the broad showing of the overall combination, these patents are in no manner concerned with applicant's improved construction and are subject to the above noted disadvantages of prior art couplings. For example, Eschbaugh discloses a retainer having comparatively long axially extending portions or fingers 21 (between the lugs 28 and abutment 13 of the conduit 11) that must withstand the operating pressure tending to urge the conduit 11 axially rightward, and are thus readily subject to buckling under pressure.

Bartholomew, U.S. Pat. Nos. 4,423,892, 4,541,658, and 4,601,497 are somewhat similar to Eschbaugh and illustrate a housing having both radially enlarged and radially reduced housing passages, see FIG. 11 of -892, FIG. 2 of -658, and FIG. 11 of -497. The retainers shown in these patents are likewise subject to the above noted disadvantages of the prior art and are significantly different from and unrelated to applicant's improved retainer and coupling as claimed, both in regard to the structure and cooperation of their retainers with the conduit and housing. In particular, the plastic jaws 210, 214 of Bartholomew -892 and -497 and the molded plastic retainers, FIG. 1 of -658 and FIG. 15 of -497 cannot withstand high operating temperatures under the hood of a modern automobile. The two parts of retainer 570 of Bartholomew -658, FIG. 24, provide no means for minimizing abrasive wear and fatigue at the areas of contact of that retainer with the housing 609 and conduit 596.

It is to be understood that the invention is not limited in its application to the specific details described herein, since the invention is capable of other embodiments and of being practiced or carried out in various ways, and that the phraseology or terminology employed herein is for the purpose of describing the invention claimed in the appended claims.

BRIEF DESCRIPTION OF THE INVENTION

Figure 1:
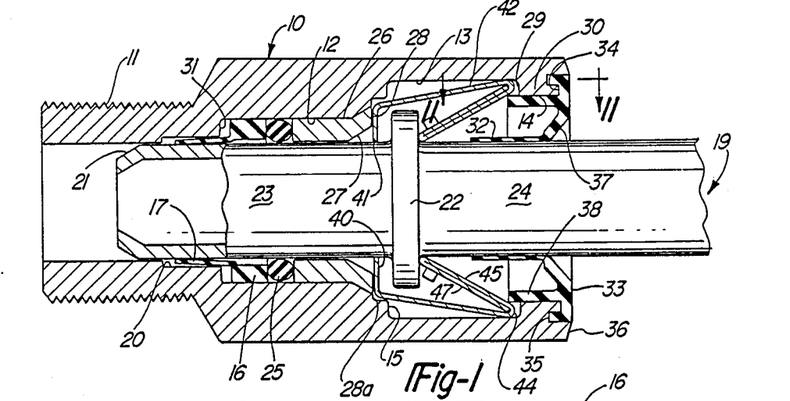
FIG. 1 is a longitudinal midsectional view of an assembled coupling embodying the present invention and illustrating an optional dust shield in the assembly.
Figures 2, 4:
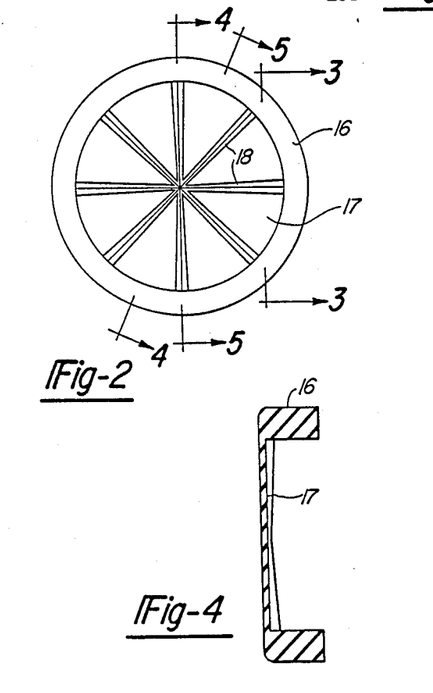
FIG. 2 is a plan view, of one of the closure means optionally present in the coupling assemblies of this invention.
FIGS. 3, 4, and 5 are sectional views taken in the direction of the arrows substantially along the lines of 3—3, 4—4, and 5—5 respectively of FIG. 2.
Figure 3:
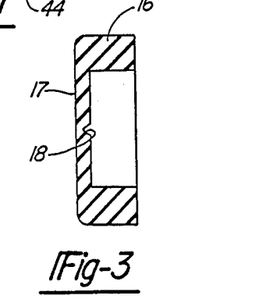
Figure 5:
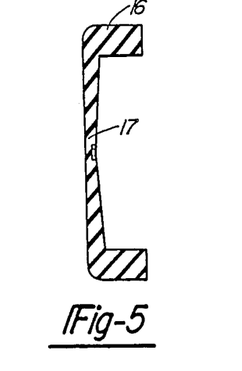

Referring to the drawings, a preferred embodiment of the present invention is illustrated in FIG. 1 comprising a tubular housing 10 having a threaded end 11 adapted for screw threaded attachment with a mating part of a fluid containing apparatus such as a pump or filter that could be part of an automobile transmission, an automobile fuel system, or a refrigerating apparatus, for example. Where the housing 10 is intended for attachment with a flexible conduit, the threaded end 11 may be replaced by a conventional annular fluid coupling bead.

The passage through the housing 10 comprises a reduced diameter passage 12 in communication coaxially with an enlarged diameter passage 13, which unless optionally closed as described below, communicates coaxially endwise via an entry 14 with the exterior. The leading end of the passage 13 is defined in part by an annular radially inwardly extending shoulder 15 of the housing 10. A closure means illustrated as a one piece molded perforable seal of elastomeric material within the reduced diameter passage 12 comprises a comparatively thick annular rim 16 encompassing a perforatable diaphragm 17 provided with a number of radially extending V-grooves 18 to facilitate rupturing upon insertion of a tubular conduit 19.

The rim 16 is in sealing engagement with the inner cylindrical periphery of passage 12 and, prior to insertion of the conduit 19, the diaphragm 17 extends transversely across the passage 12 to close the latter. The passage 12 communicates coaxially with a smaller diameter cylindrical passage 20 provided to receive the leaves or segments of the ruptured diaphragm 17 when pierced by the conduit 19. To facilitate guidance of the conduit 19 coaxially within the housing 10 and perforation of the diaphragm 17, the leading end or nose of the conduit 19 is tapered conically at 21. An annular radially outward enlargement or projection 22 of the conduit 19 partitions the outer cylindrical surface of the latter into a leading portion 23 and a trailing portion 24 and limits the extent of insertion of conduit 19 into the housing 10.

Also located within the reduced diameter passage 12 is a resilient annular O-ring seal 25 that provides an annular seal entirely around the conduit portion 23 between the latter and the housing 10. The seal 25 is held in place adjacent to the rim 16 by an annular steel bushing 26 tightly pressfitted into the passage 12 and frictionally held in place with sufficient force to resist operational pressure within the housing 10 tending to force the seal 25 rightward in FIG. 1. The bushing 26 may thus be considered as an integral part of the housing 10. The right hand or trailing portion of the bushing 26 is enlarged conically at 27 and seats against a mating conically tapered portion of the housing 10 to limit leftward insertion of the bushing 26, such that the trailing end 28 of bushing 26 is flush with and comprises a radially inward continuation of an annular housing shoulder 28a, offset from shoulder 15. The leading and trailing ends of the passage 13 are thus defined by the annular radially inwardly extending leading shoulders 15, 28, 28a and an annular radially inwardly extending trailing shoulder 29 of an annular housing flange 30 that terminates radially inwardly at a cylindrical surface defining the inlet 14. The leading end of passage 12 is defined by an annular radially inwardly extending shoulder 31.

The coupling assembly illustrated in FIG. 1 optionally includes the illustrated type of closure for inlet 14 of housing 10. Prior to insertion of the conduit 19 into the housing 10, the inlet 14 is optionally closed by a perforatable diaphragm dust shield 32, FIG. 6, which is generally similar in manner of perforation during assembly, but different in construction, to the perforatable diaphragm 17. The dust shield comprises a unitary molded structure of elastomeric material including a thickened rim 33 encompassing the outer periphery of the rupturable diaphragm 32 and provided with an annular axially inwardly opening groove 34 dimensioned to receive a mating endwise extending annular flange of the housing flange 30 in sealing relationship. An annular axially inwardly projecting flange 35 of the thickened rim 33 lies radially outwardly of the groove 34 and extends in sealing relationship into a mating axially endwise opening annular groove in flange 30. An annular portion 36 of housing flange 30 overlies the elastomeric rim flange 35 and extends to the endwise limit of rim 33 to shield the flange 35 from external forces that might otherwise accidentally dislodge the latter and rim 33 from sealing engagement with flange 30.

From the axially endmost and radially inner portion of the thickened elastomeric rim 33, the latter converges conically at a guide 37 into the entry 14 and terminates at the outer periphery of the rupturable diaphragm 32 at a diameter sufficiently less than the diameter of the trailing portion 24 of the conduit 19 so as to contact the latter in sealing engagement upon insertion of the conduit 19 into the housing 10. The portion 37 of the rim 33 serves as a conical guide for the tapered leading end 21 of the conduit 19, so that the latter will be centered coaxially with the housing 10 during the insertion process. The perforatable diaphragm 32 continues conically from the radially inner and smaller diameter of the conical guide 37 at the same conical angle, about 45 degrees from the axis of the housing 10 by way of example. The conical seal 32 thus cooperates with the thicker conical rim portion 37 in the coaxial guidance of the conduit 19 and also completely closes the entry 14. An annular axially extending flange 38 of the thickened rim 33 peripherally contacts the cylindrical surface defining entry 14 to stabilize the sealed connection between the rim 33 and flange 30 and to resist cocking of the rim 33 out of its coaxial position in the event the nose 21 of the conduit 19 does not initially engage the guide 37 coaxially when being inserted. The flange 38 and conical portions 32 and 37 thus cooperate to prevent disengagement of the rim 33 from the flange 30 during insertion of the conduit 19 into the housing 10, and also serve to seal against the periphery of conduit 24 upon assembly as shown in FIG. 1.

Figures 6, 7, 8, 9, 10, 11:
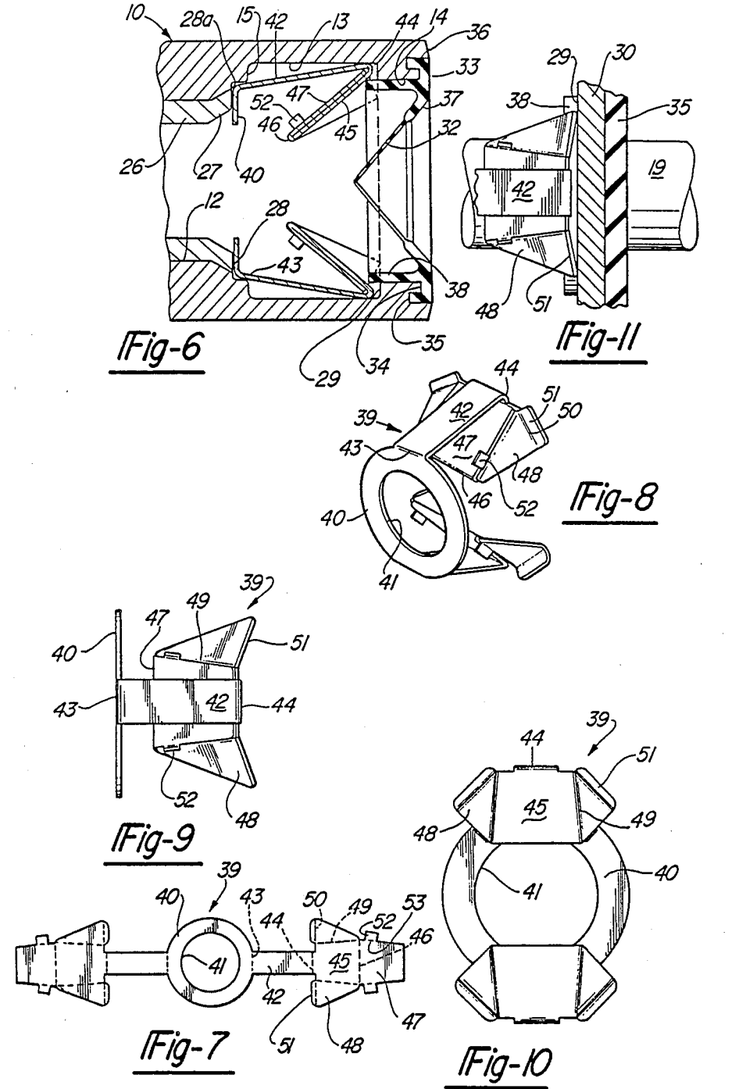
FIG. 6 is a fragmentary view similar to FIG. 1, showing the housing sub-assembly prior to assembly with the conduit.
FIG. 7 is a plan view of a stamped sheet steel blank from which the retainer of this invention is formed.
FIG. 8 is an isometric view of the improved sheet spring steel retainer of this invention that is shown in the coupling assembly of FIG. 1, and in the sub-assembly of FIG. 6.
FIG. 9 is a plan view of the retainer illustrated in FIG. 8.
FIG. 10 is an elevational view of the retainer, looking from the right in FIG. 9.
FIG. 11 is a fragmentary sectional view taken in the direction of the arrows substantially along the line 11—11 of FIG. 1, showing the retainer during operation under load.

The housing 10 and conduit 19 are maintained in assembled relationship by means of a one-piece spring steel retainer 39, preferably, formed from a sheet steel stamping, FIG. 7, to provide an annular base 40 that lies in a plane normal to the housing 10 adjacent to the shoulder 28, 28a and extends around an opening 41 adapted for free coaxial passage of the leading conduit portion 23. A plurality of outer arms 42 symmetrically spaced circumferentially extend generally axially within the passage 13 from the outer periphery of the base 40 to the inner periphery of the passage 13 adjacent to the shoulder 29. Two such arms 42 are shown and preferred but three, four or more may be used where increased retention capability is required. Arms 42 are formed by being bent at 43, FIGS. 7 and 8, from the plane of the base 40 to the axial position approximately as illustrated, FIGS. 6 and 8. The juncture or bend 43 between each arm 42 and the base 40 comprises a resilient spring hinge under light tension urging the arm 42 radially outwardly into resilient contact with the cylindrical inner periphery of the enlarged passage 13 with sufficient force to prevent accidental removal of the retainer 39 from the housing 10 prior to insertion of conduit 19, FIG. 6.

The right end of each arm 42, FIG. 1, bends back on itself at 44, FIG. 7, to provide a thrust resisting, or thrust transmitting, arm 45 extending inwardly in FIG. 1 at an acute angle to the arm 42 to the conduit portion 24 adjacent to the projection or enlargement 22, then closely back on itself in a second reverse bend 46, FIG. 7, to the apex of the angle between the arms 42 and 45 and in contact therewith at their juncture to provide a reinforcing arm 47. The bend 44 or juncture between the arms 42 and 45 also comprises a spring hinge resiliently urging the arm 45 radially inwardly into contact with the conduit portion 24. The bend 44 extending around the adjacent end of the arm 47 also comprises a smooth rounded region for contacting the housing 10, or flange 29 in the event extreme operating pressure should force the rounded bend 44 into such contact, thereby to minimize abrasive wearing of the housing 10 as a result of such contact. However, as noted in FIGS. 1 and 6 and as described below, the juncture 44 does not make such contact during typical operation of the coupling. The rounded juncture 46 between the arms 45 and 47 also provides a smoothly rounded region of contact with the conduit 19 to minimize abrasion.

It is to be noted that the arms 45 and 47 in doubled mutually reinforcing relationship with each other transmit without excessive bending or buckling the entire force resulting from the pressure on conduit 19 tending to urge the latter rightward to annular shoulder 29 of the housing 10, which pressure may amount to several hundred or even thousands of pounds per square inch. The outer arm 42 primarily provides the means for locating the arms 45 and 47 within the housing, FIG. 6, and accordingly may be a non-thrustload bearing structure of relatively narrow width transversely of the axis. In this regard, the arms 45 and 47 are appreciably wider circumferentially or transversely of the housing axis than the arm 42, FIGS. 7, 8, and 10, and are of dimensions selected so as to withstand the buckling force to which they are to be subjected during operation.

As illustrated in FIGS. 7-10, one of each of the arms 45 and 47, the arm 45 in the present instance, is provided with a pair of lateral wings 48 extending in circumferentially opposite directions from the circumferentially spaced edges of the arm 45. These wings 48 bend radially inwardly at their junctures 49 with their associated arm 45 to define planes that preferably converge radially outwardly to an axial midplane that bisects the arms 45 and 47, and also so that their ends adjacent to shoulder 29 are confined within the annular area of that shoulder. These ends of the wings 48 are also bent radially outwardly at 50, FIG. 7, to provide radially extending contact pads 51 having surfaces for contact with the trailing shoulder 29. These wing-pad portions, 48, 51, provide a broadened contact surface as compared to the thickness of the sheet metal from which the retainer 39 is stamped and the circumferential reverse bend ends 44 thereof, and these broadened surfaces serve to distribute the axial force of the arms 45 and 47, directed against the shoulder 29, over a circumferentially enlarged portion of the surface area of annular shoulder 29 at a plurality of circumferentially spaced locations.

As may be seen more particularly in FIGS. 7 and 9, the bends 49 converge axially endwise toward the trailing shoulder 29, such that the surfaces of the pads 51 as viewed in FIG. 9, diverge axially endwise. Thus the circumferentially outer portions of the pads 51 are first to engage the shoulder 29 when the coupling is subjected to low fluid pressures. As the pressure within the coupling increases, the retainer 39 yields resiliently, in part by slight resilient bending of the arms 45, 47 and in part by resilient deformation of the wings 48 and pads 51, such that the area of surface contact of the latter with the shoulder 29 increases. In this regard, the shoulder contacting surfaces of the pads 51 lie in planes that preferably converge at the aforesaid axial midplane along a radial line, and during normal operation of the coupling, hold the bend 44 out of contact with the shoulder 29, FIG. 11. Design considerations of the thrust arms 45, 47 and the wing-pad portions 48, 51 to insure axial separation between bend 44 and shoulder 29 during use are described below.

The housing, retainer, and dust shield which is optional but preferred to be present, are desirably assembled into a subassembly of the connector shown in complete assembly in FIG. 1. Such a subassembly is shown in part in FIG. 6 and comprises housing 10, retainer 39, and dust shield 32-38. Housing 10 includes bushing 26 press fitted into reduced diameter passage 12, O-ring seal 25, and optionally, and preferably, includes closure seal 16, 17. Such a subassembly is made by pressing the pair of arms 42 of the retainer 39 resiliently toward each other to enable insertion of the retainer 39 coaxially through the entry 14 into the enlarged diameter passage 13, with the base 40 adjacent to the surface 28 of the bushing 26. The cylindrical step of the housing 10 between the offset shoulders 15 and 28a extends closely around the base 40 and adjacent portions of the arms 42 to locate the retainer 39 coaxially within housing 10. Once in place, the arms 42 spring radially outwardly to the position illustrated in FIG. 6 to prevent accidental removal of the retainer 39. Thereafter the dust shield 32 is assembled by forcing its rim 33 coaxially into sealing contact with the housing flange 30 as illustrated in FIG. 6.

The assembled housing may then be shipped as a self contained unit to the location whereat it will be used and connected at its end 11 with the fluid containing device for which the coupling is intended. The retainer 39 under spring tension urging arm 42 radially outward cannot be removed accidentally from the housing 10, nor can the seals 17 and 25 be accidentally removed. The diaphragm seal 16, 17, when present, will prevent accidental leakage of fluid from said fluid containing device until insertion of the conduit 19.

When it is desired to complete the coupling for use, the tapered nose 21 is moved coaxially into the conical guide 37 of the rim 33 and is then forced through the perforatable seal 32. The leaves of the perforated seal 32 remain connected to the rim 33 and bend unobjectionably into the entry 14 around the conduit 19. The outer periphery of the annular projection 22 and conical guide 37 are dimensioned to enable passage of the projection 22 through the guide 37, which yields resiliently during the passage. After passage of the projection 22, the resilient guide 37 snaps back into sealing engagement with the conduit 19 as shown, FIG. 1. The arms 45, 47 are forced radially outwardly by contact with the projection 22 until the latter passes their juncture 46, whereupon the arms 45, 47 spring radially inwardly to the position illustrated in FIG. 1 to prevent removal of the conduit 19.

The reduced diameter portion of the guide 37 closely engaging the conduit portion 24, in cooperation with the sealing engagement between the axial extension of flange 30 within groove 34 of rim 33, and the elastomeric flange 35 within the mating groove of flange 30 provide an effective dust shield for preventing entry of debris into the enlarged diameter passage 13. Also, the inner periphery of the bushing 26 is dimensioned for free guided sliding passage of the conduit portion 23 therethrough and the conical portion 27 serves to facilitate coaxial guiding of nose 21 to the perforatable diaphragm 17, which is then perforated by passage of the conduit portion 23 therethrough. The leaves of the ruptured seal 17 remain attached to the rim 16 and are retained within the relieved passage portion 20, FIG. 1, and rendered unobjectionable within the coupling. All of the annular and cylindrical portions of the coupling are coaxial with the longitudinal axis of conduit 19 and all of the other components of the coupling are circumferentially arranged symmetrically around that axis with respect to their similar components.

It has been found that the comparatively thin sheet steel arms 45, 47 in contiguous relationship and similar width as above described form a satisfactory thrust resisting means. It is to be understood, however, that the two contiguous arms formed by bending arm 45 and then arm 47, as described, is only one manner in which a thrust resisting means can be provided. It is also satisfactory to use a single layer planar arm means of selected thickness, or of a channel construction or the like, to provide the necessary resistance to axial thrust loads transmitted from the tubular conduit to shoulder means on the housing as is required by uses presenting high vibrational or pulsating forces tending to disconnect the conduit from the coupling assembly. Such thrust resisting arm means may be preformed separately and joined to wing-pad means of the type illustrated by means 48, 51 by any conventional joining method, such as brazing, welding, adhesives or the like.

The conduit 19 may be released from the retainer 39 and withdrawn from the housing 10 by means of a release tool comprising a tube of annular cross section having an outer diameter dimensioned to pass through entry 14 and slightly greater than the outer diameter of projection 22, and having an inner diameter adapted to fit in loose sliding relationship around the outer periphery of the conduit 19. The tubular tool may be moved coaxially along the conduit 19 into the passage 13 and into engagement with the arms 45. Upon continued leftward movement of the tubular tool, the arms 45 and 47 will be swung upwardly about the hinge connection 44 until the bend 46 clears the outer periphery of the projection 22. The tool and conduit 19 may then be withdrawn rightwardly from the interconnection with the housing 10, whereupon the arms 45, 47 will spring back to the position illustrated in FIG. 6.

In order to prevent inadvertent excess bending of the arms 45, 47 beyond the outer periphery of projection 22, as for example by use of a tubular release tool of the type mentioned above but having too large an outer diameter, the reinforcing arm 47 is provided with a pair of circumferentially spaced tabs 52 that bend radially outwardly at 53 from the circumferentially spaced edges of the arm 47. Thus in the event a tubular tool having an outer diameter larger than necessary to spring the arm 45 radially outwardly sufficiently to clear the projection 22, the radially outer ends of the tabs 57 will engage the inner circumference of the passage 13 and prevent further insertion of the tool and possible permanent deformations of the retainer 39 by bending of the juncture 44 beyond its elastic limit.

As above indicated the preferred form of the retainer of this invention shown in FIGS. 8-10 is preferably formed from a spring steel stamping such as that shown in FIG. 7 even though other methods of making such a retainer than those described above generally may be used. For automotive use in transmissions for example, the improved spring steel retainer of this invention and of the type shown in FIGS. 8-10 has been found to provide adequate and safe retention capability under extreme temperature conditions and rigorous high pressure vibrational or pulsating disconnect force conditions of use. Under these same operational conditions plastic material retainers of heretofore known constructions are unsatisfactory.

Spring steel, preferably stainless, is the material of first choice for use in the retainer of FIGS. 8–10. However, it is satisfactory for retainers that are to be used under conditions free of contact with corrosive fluids or gases and at low temperatures and under low shock or impact loadings to use high carbon spring steels available in cold rolled flat strip form such as the blue-tempered clock steels. For some end uses it is satisfactory to employ alloy spring steels having the ability to operate at high and low temperatures under conditions of high stress, shock and impact loadings such as chromium vanadium steel, ASTM A 231 or chromium silicon ASTM A 401; such materials are desirable where a channel-type thrust resisting arm means is substituted for the double flat strip thrust transmitting arm construction illustrated by arms 45, 47. Stainless spring steels, AISI type 302 or 301, half-hard are especially suitable and are preferred for uses in automotive transmissions. Other stainless spring steels may be selected and used in order to satisfy the particular requirements of other uses as will be apparent to those skilled in the art of quick connect couplings.

For applications in which the connector functions in the presence of transmission fluids, or corrosive oils or greases, or in installations including high temperature gases or high humidity environments it is desirable to provide protective coatings on the housing and tubing conduit. Satisfactory housing coatings for this purpose are black corrosion protective coatings which typically include a base zinc phosphate coating, chromic acid rinsed or sealed and overlaid with an electrodeposited black organic coating that is baked in place; such coatings are conventional and commercially available from numerous suppliers. Tubing conduit coatings of the conventional lead-tin alloy or cadmium plating type are satisfactory and the lead-tin alloy coatings are preferred.

A retainer for use in an automobile transmission having the configuration of FIG. 8–10, for use with 5/16" diameter tubing, was made using flat strip stock, AISI 302, half hard, having an approximate hardness of Rockwell C 30/35 and available from Precision Products, Incorporated, 2252 Curtiss St., Downers Grove, Ill. 60515. The tubing was lead-tin coated and available from Fabex, Inc. of Fairview, Mich.

The strip stock of 0.012" thickness was stamped into a blank having the configuration of FIG. 7. In a first bending operation tabs 52 were bent 90° from the position shown in FIG. 7 to the position shown in FIG. 8. Pads 51 were bent along line 50 relative to the plane of wing 48 about 30°–50°, and wings 48 were bent from the plane of arm 45 about 55°–75°. Arm 45 is then bent around line 44 and arm 47 is bent around line 46 to a position in which arm 47 overlies and is contiguous with arm 45 as best seen in FIG. 6. Outer locator arm 42 is then bent slightly relative to the plane of base 40 to thus form the completed retainer shown in FIG. 8. For use with ¼" to ⅝" diameter tubing conduit the best amount of angular bending for particular uses usually lies within the angular ranges given above. Flat strip stock thickness may satisfactorily vary in the range of about 0.010" to about 0.020". Typical dimensions for the retainer designed for use with 5/16" diameter tubing is approximately 0.4 inches from reverse bend 44 on the upper arm 42 to the corresponding bend on the lower arm as seen in FIGS. 8 and 10. The axial dimension from base 40 to the axially outer radial end extension of pad 51 is approximately 0.7 inches. It is to be understood that the above illustrative dimensions, spring steel thickness, widths of locator arm 42 and thrust resisting arms 45, 47, and the axial lengths and radial dimensions of wings 48 and pads 51 will vary with the conditions under which the retainer must function. It is important, however, to select a spring steel having sufficient strengths to insure that the wing-pad thrust transmitting surface area in contact with the annular surface of trailing housing shoulder 29, and the strength and impact load resistance of thrust receiving arms 45, 47, or their equivalents is such that the surface of severe bend 44 does not repetitively contact against the opposing portion of housing shoulder 29, or its equivalent during normal use for which the retainer is designed. Appropriate modification of spring strip thickness, width and the dimensions of wings 48 and pads 51 can easily be selected to produce satisfactory retention and leak-free and fail safe operation of the quick connector of this invention under rigorous impact loading conditions or relatively low loading conditions.

The retainer 39 offers the advantage of ease of assembly of conduit 19 into housing 10. This advantage relative to prior quick connectors of similar size is particularly important in automobile assembly line operations which are performed by hand. The spring steel resilience of thrust resisting arm means 45, 47 is such that only a low axial force is required to radially deflect the inner ends of arms 45, 47 sufficiently to enable the outer periphery of tubing projection 22 to pass bend 46 as conduit 19 is inserted toward the left in FIG. 1. Such insertion force is in the range of about 4 to about 15 pounds for insertion of a ¼" to ⅝" diameter tubing to complete assembly of the tubing into its assembled position of FIG. 1.

The embodiments of the invention in which an exclusive property or privilege is claimed are defined as follows:

1. A coupling assembly comprising a housing having an axial passage therethrough comprising an enlarged diameter passage communicating between an inlet and a reduced diameter passage, a tubular conduit having a radial outward projection partitioning the exterior of said conduit into leading and trailing portions, said leading portion being insertable in one direction through said inlet and enlarged diameter passage and into said reduced diameter passage, said radial projection being insertable in said direction through said inlet into said enlarged diameter passage, said reduced diameter passage being dimensioned to block entry of said radial projection, said enlarged diameter passage being defined at axially opposite ends by radially inwardly extending leading and trailing shoulders of said housing proximate said reduced diameter passage and inlet respectively, a retainer insertable into said enlarged diameter passage for engaging said conduit projection and said trailing housing shoulder to secure said conduit within said housing, said retainer comprising a base adapted to be confined coaxially within said enlarged diameter passage and having an axial opening dimensioned for passage of said leading conduit portion therethrough and for blocking passage of said radial projection therethrough, said retainer also comprising a plurality of retaining members spaced circumferentially around the axis of said opening, each retaining member comprising a radial outer locating arm connected to said base and to thrust resisting means dimensioned to extend axially in the direction opposite said one direction and radially outwardly from said trailing conduit portion at a location adjacent to said radial projection to a radially outer end, and means for spacing said radially outer end from said trailing shoulder comprising wing means of said thrust resisting means extending circumferentially and axially in said opposite direction to axial and radial locations beyond said radially outer end and terminating axially at said locations in radially extending pads engaging said trailing shoulder and for maintaining said radially outer end axially spaced from said trailing shoulder.

2. A coupling according to claim 1, said retainer being formed from spring steel and wherein each radially outer locating arm is dimensioned to extend in said opposite direction from adjacent to said leading shoulder to said radially outer end of said thrust resisting means and joined thereto at an acute angle to effect a resilient hinge connection therewith, said thrust resisting means extending at said angle from said outer locating arm for contacting said trailing conduit portion adjacent to said radial projection, said thrust resisting means having circumferentially spaced opposite edges, said wing means comprising a pair of wings extending from said edges respectively and each wing also extending axially in said opposite direction to a location axially outwardly of said hinge connection and bending radially at said location to provide said pads.

3. A coupling according to claim 1, said retainer comprising a one-piece sheet spring steel stamping formed to provide said base and wherein each said radial outer locating arm is joined to a radially outer portion of said base and extends in said opposite axial direction within said enlarged diameter passage from said radially outer portion of said base for engaging said housing at a location spaced in said one direction from said trailing shoulder, then bends reversely at an acute angle at said location to provide a thrust resisting arm extending at said acute angle from said outer locating arm to said trailing conduit portion adjacent to said radial projection, said thrust resisting means comprising each thrust resisting arm of said plurality of retaining members, each thrust resisting arm having circumferentially spaced opposite edges, said wing means comprising a pair of wings extending from said edges respectively, each wing also extending axially in said opposite direction to a location beyond the reverse bend between said outer locating arm and thrust resisting arm and bending radially at the latter location to provide said pads.

4. A coupling according to claim 3, the juncture between each radially outer locating arm and radially outer portion of said base comprising a resilient hinge connection, and the juncture at said acute angle between each radially outer locating arm and thrust resisting arm also comprising a resilient hinge connection.

5. A coupling assembly comprising a tubular conduit having a radially outward projection separating leading and trailing portions of said conduit, a housing having an axial passage extending therethrough comprising a reduced diameter passage for containing said leading portion of said conduit and an enlarged diameter passage for containing said projection and defined at axially opposite leading and trailing ends by radially inwardly extending leading and trailing shoulders respectively of said housing, a retainer comprising a one-piece formed sheet spring-steel stamping insertable into said enlarged diameter passage for engaging said projection and shoulders to secure said conduit within said housing, said retainer comprising a base adapted to be confined coaxially within said enlarged diameter passage adjacent to said leading end thereof and having an axial opening dimensioned for passage of said leading conduit portion therethrough and for blocking passage of said projection therethrough, said retainer also comprising a plurality of retaining members spaced circumferentially around the axis of said opening, each comprising a radially outer locating arm joined at a resilient hinge connection to a radially outer portion of said base and bending axially at said connection to extend within said enlarged diameter passage in one axial direction from said base for engaging said housing at a location spaced from said trailing shoulder in the axial direction opposite said one direction, then bending reversely at said location to provide a thrust resisting arm extending at an acute angle from said outer locating arm and converging radially inwardly and axially for contacting said trailing conduit portion adjacent to said radial projection, then bending reversely to provide a reinforcing arm extending along said thrust resisting arm and in contact therewith to the apex of said angle, the bend between said outer locating arm and thrust resisting arm at said location also comprising a resilient hinge connection between the latter two arms, one of the arms comprising the thrust resisting arm and reinforcing arm of each retaining member having circumferentially spaced opposite edges, and means for spacing said bend at said location from said trailing shoulder comprising a pair of wings of said retaining member extending from said edges respectively and also extending axially in said one direction beyond said location and bending radially outwardly adjacent to said trailing shoulder to provide pads for engaging said trailing shoulder.

6. A coupling according to claim 5, said reinforcing arm extending into said angle and engaging both said locating arm and thrust resisting arm at said apex.

7. A coupling according to claim 5 wherein, when said retainer and conduit are assembled within said housing, the hinge connection between said base and each locating arm is under spring tension urging the juncture between the latter arm and thrust resisting arm radially outwardly into contact with said housing, and the hinge connection between each locating arm and thrust resisting arm is under spring tension urging enlargement of said acute angle.

8. A coupling according to claim 7, said wings of each pair bending along said edges inwardly with respect to said axis.

9. A coupling according to claim 5, each retaining member being symmetrical with respect to an axial midplane, said pads of the wings of each pair defining planes parallel to, and diverging in said one direction from a radial line in said axial midplane.

10. A coupling according to claim 9, said wings of each pair extending from said thrust resisting arm and bending along said edges inwardly with respect to said axis.

11. A coupling according to claim 10 wherein, when said retainer and conduit are assembled within said housing, the hinge connection between said base and each locating arm is under spring tension urging the juncture between the latter arm and thrust resisting arm radially outwardly into contact with said housing, and the hinge connection between each locating arm and thrust resisting arm is under spring tension urging enlargement of said acute angle.

12. A coupling according to claim 5, the hinge connection at each said acute angle being resiliently yieldable to enable swinging of the juncture between the associated thrust resisting and reinforcing arms to a location radially outward of the outer periphery of said projection to free said conduit from said retainer for enabling withdrawal of said conduit from said housing.

13. A coupling according to claim 5, said housing having an annular flange defining a cylindrical entry opening into said enlarged diameter passage, means for closing said entry opening prior to insertion of said conduit into said passage comprising a perforatable diaphragm seal having a thickened rim of elastomeric material, annular sealing means of said rim and flange in sealing engagement entirely around said entry opening, means for preventing accidental access to the outer periphery of said annular sealing means of said rim comprising a peripheral portion of said housing flange encompassing and extending axially for the axial extent of said outer periphery of said annular sealing means of said rim, said diaphragm seal being perforatable upon insertion of said conduit through said entry opening into said passage, and an annular sealing portion of said rim engageable with the outer periphery of said conduit in sealing relationship when said conduit is inserted into said passage.

14. A coupling according to claim 13, said trailing shoulder comprising a radially extending surface of said annular housing flange, said flange having an axially endwise opening annular channel therein, and said rim having an annular axially extending flange for projecting into said annular channel in sealing relationship.

15. A coupling according to claim 14, and means for reinforcing said rim against deformation comprising a second annular axially extending flange of said rim closely engaging said cylindrical surface of said entry opening in coaxial sealing relationship.

16. A coupling according to claim 15, guide means to facilitate coaxial insertion of said conduit through said diaphragm seal comprising a conical portion of said rim converging coaxially into said entry opening, the smaller end of said conical portion being spanned by said diaphragm seal prior to said insertion of said conduit and comprising said sealing portion of said rim engageable with the outer periphery of said conduit.

17. A retainer for interconnecting a tubular conduit and a tubular housing, said retainer comprising a formed resilient one-piece sheet steel stamping having a base with an axial opening therethrough and also having a plurality of retaining members spaced circumferentially around the axis of said opening, each retaining member extending as an outer locating arm in one axial direction from a bend comprising a resilient hinge connection with a radially outer portion of said base, then bending reversely to provide a thrust resisting arm connected with said outer locating arm at a second resilient hinge connection and extending axially and radially inwardly at an acute angle to said locating arm, then bending reversely at a location spaced axially in said direction from said base to provide a reinforcing arm extending into the apex of said angle, said thrust resisting and reinforcing arms extending in mutually reinforcing contact with each other, each retaining member being symmetrical with respect to an axial midplane, one arm of the arms comprising the thrust resisting and reinforcing arms of each retaining member having circumferentially spaced edges and bending along said edges inwardly with respect to said axis to provide a pair of wings spaced circumferentially by said one arm, said wings having portions extending in said one axial direction to locations axially beyond the second resilient hinge connection and terminating at said locations in contact pads bending radially outward at said locations for contacting portions of said housing at said locations.

18. A retainer according to claim 17, said pads of the wings of said one arm defining planes parallel to and diverging in said one axial direction from a radial line in said axial midplane.

19. A retainer according to claim 18, said wings extending from said thrust resisting arm, said retainers being formed from a stainless sheet steel stamping comparable to ASTM 301 or 302 stainless sheet steel.

20. A retainer according to claim 18, said locating, thrust resisting, and reinforcing arms defining separate planes normal to said midplane, said thrust resisting arm comprising said one arm.

* * * * *